Dec. 2, 1941.　　　　　L. D. NORTON　　　　　2,264,886
PHONOGRAPH CONTROL SYSTEM
Filed April 21, 1939
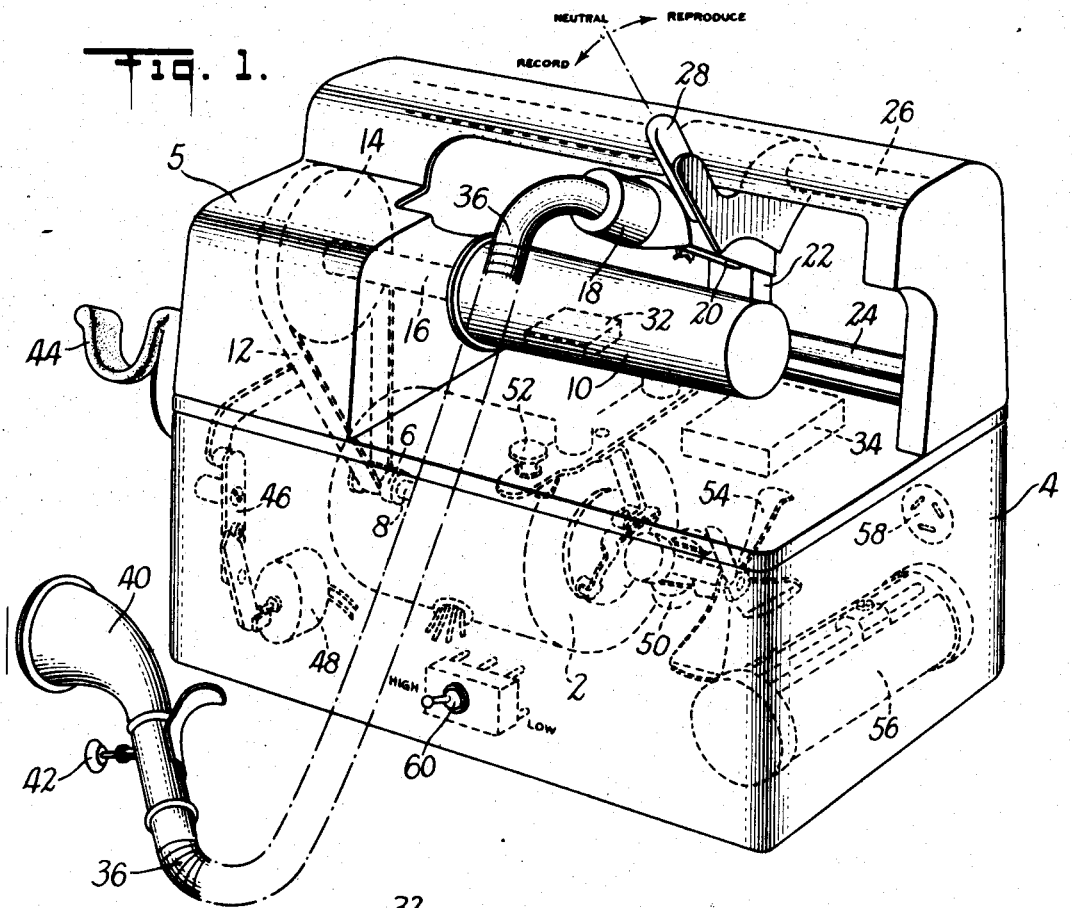
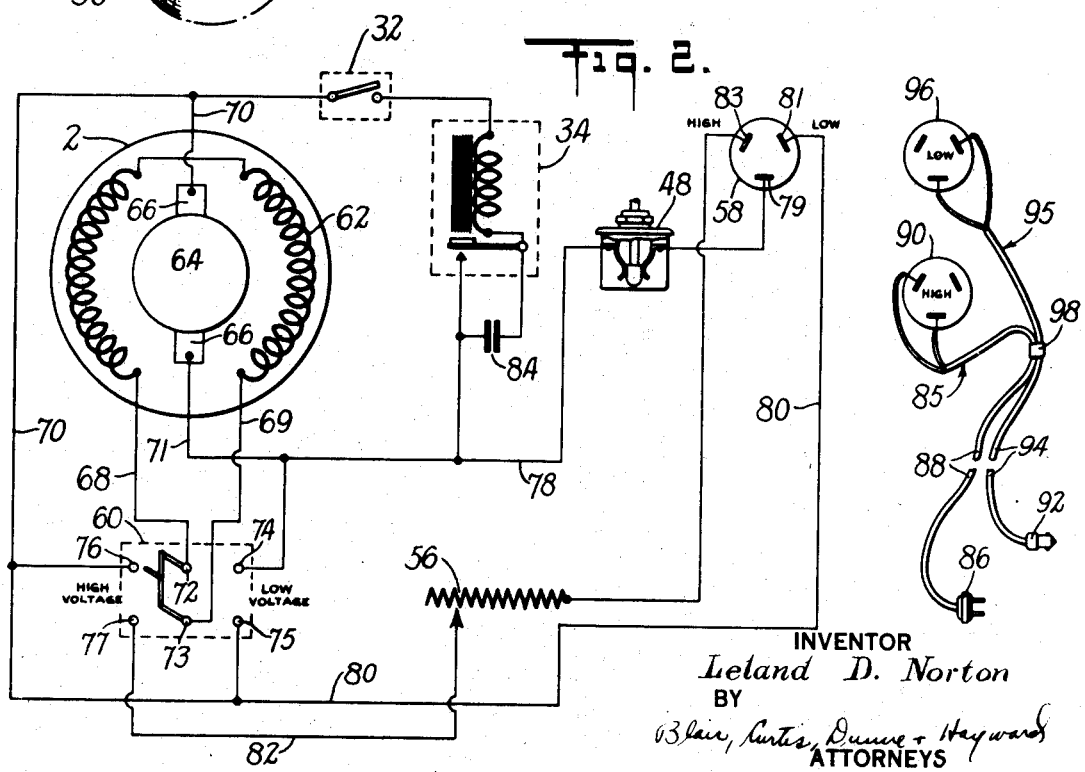
INVENTOR
Leland D. Norton
BY
Blair, Curtis, Dunne + Hayward
ATTORNEYS Patented Dec. 2, 1941

2,264,886

UNITED STATES PATENT OFFICE 2,264,886

PHONOGRAPH CONTROL SYSTEM

Leland D. Norton, Bridgeport, Conn., assignor to Dictaphone Corporation, New York, N. Y., a corporation of New York Application April 21, 1939, Serial No. 269,087

6 Claims. (Cl. 172—276)

This invention relates to dictating machines and more particularly to portable dictating machines adaptable for operation from any of the customarily available sources of electrical power.

Due to the quick tempo of modern times business men, lawyers, authors, and other persons who have occasion to do considerable dictating, frequently find it necessary or desirable to use a dictating machine in places other than their homes or offices. Thus, they require a dictating machine which will operate on any available source of electric power, such, for example, as the 220-volt or 110-volt alternating current or direct current commercial power lines, 32-volt storage battery systems encountered in farm lighting or railway lighting, or 6- or 12-volt storage battery systems usually available in automobiles or small boats. In the past this problem has been solved by using several dictating machines, each one provided with a motor suitable for operation on the particular voltage available in the office, train, automobile, boat, etc., or by using a standard dictating machine with 110-volt motor, connected to a motor generator set having a low voltage driving motor, for example, a 6-volt motor for operation from an automobile storage battery. None of these arrangements are particularly satisfactory because they are complicated, inefficient, and costly.

In accordance with the present invention, this problem has been solved by providing a dictating machine with a universal motor unit capable of operating from any of the usually available electrical power supplies. This universal driving unit requires a minimum of parts, and only a few simple adjustments are necessary to adapt it for operation on any usually available power supply. This is accomplished by providing a motor having a commutated armature and a field winding connected in a circuit with a switching arrangement and an adjustable series impedance so that the field winding may be connected in shunt across the armature when it is desired to operate the dictating machine on low voltage sources such as a 6-volt storage battery, or so that the field winding may be connected in series with the armature and the adjustable impedance when it is desired to operate the dictating machine on higher voltages such as the usual 110-volt power supply.

It is an object of this invention, therefore, to provide a control system for a portable dictating machine having a universal motor, adapted simply and efficiently to control the operation of said machine with any of the usually available sources of electrical power. Other objects will be in part obvious and in part pointed out hereinafter.

For a further disclosure of the invention reference may be had to the following description and the accompanying drawing, in which:

Figure 1 shows in perspective a commercial dictating machine embodying the invention; and Figure 2 is a schematic wiring diagram of the present control system employed with the dictating machine shown in Figure 1.

Referring to Figure 1, a universal driving motor 2, is suitably mounted inside a housing 4 supporting a dictating machine. The motor 2, by means of a pulley 6 mounted on one end of the motor drive shaft 8, a belt 12, a pulley 14, and a clutch mechanism, not shown, drives a record supporting mandrel 10 which is mounted on a shaft 16 suitably journaled on the frame 5 of the machine.

The usual tone arm 18 and sound box 20 are mounted on a carriage 22 which is moved along a guide bar 24 in a path parallel to the record surface by means of a feed screw 26 driven from mandrel shaft 16 by suitable gears, not shown, whenever the record supporting mandrel 10 is rotated. A control lever 28, shown in its neutral position, is provided on the carriage 22 for conditioning the sound box 20 for recording, reproducing, or to be inoperative or neutral. The movement of this lever 28 to position the sound box is transmitted through a suitable link and lever system, not shown, to a suitable switch 32 connected in the circuit to control a signal buzzer 34 in the manner described in United States Patent No. 1,989,783, so that the buzzer gives a warning signal upon closure of the motor circuit with the sound box conditioned otherwise than for recording.

The tone arm 18 is connected by means of a flexible speaking tube 36 (shown partially broken away) to a mouthpiece 40. The mouthpiece carries a control button 42 which is connected by means of a Bowden wire, not shown, passing through the speaking tube 36 to clutch-operating mechanism, not shown. This clutch-operating mechanism effects connection of the large pulley 14 with the mandrel shaft 16 to start and stop the rotation of the mandrel 10 in response to depression and release of control button 42.

The end of the speaking tube 36 and the mouthpiece 40 are adapted to rest on a pivoted hanger arm 44 when the machine is not in use. This arm 44 is connected through a link and lever arrangement 46 to a snap-acting switch 48 which is connected in the power supply circuit to the machine motor.

A centrifugal governor 50 is attached to the drive shaft 8 of the motor 2, and an adjustment mechanism 52 is provided for adjusting the speed maintained by this governor. A fan 54 is also attached to drive shaft 8 of motor 2 to circulate air about a variable current-limiting resistor 56 mounted inside the housing 4. The resistor 56 is provided for adjusting the circuit to adapt it to operate on various line voltages, as will hereinafter be described.

A three-way receptacle 58 is mounted in the back of housing 4 for connecting the instrument to the power supply. A double-pole double-throw snap-switch 60, mounted on the front of the housing 4, is adapted to condition the circuit for low voltage operation when thrown to the right and for high voltage operation when thrown to the left.

The driving motor 2 (see Figure 2) is provided with a field winding 62, and an armature 64 with its associated commutator and brushes 66. The specific form of the armature and field structures, the number of turns in the coils, the size of the wire used, the number of commutator bars and brushes, and other details of the design of motor 2 depend upon the speed and power desired and upon the particular range of voltages through which the motor is to be operated.

The arrangement whereby these various electrical elements of the dictating machine are connected so as to permit its universal operation on almost any usually available commercial source of power may be more readily understood by referring to Figure 2, which shows a schematic wiring diagram of the various circuit elements. The connections to the field 62 and the armature 64 are brought out of the motor separately by means of conductors 68 and 69, and conductors 70 and 71, respectively. The conductors 68 and 69 from the field 62 are connected to the center poles 72 and 73 of the double-pole double-throw switch 60. Conductor 70 from one side of the armature 64 is connected to a pole 76 on one side of the switch 60 and to the diagonally opposite pole 75 on the other side of the switch. Conductor 71 from the other side of the armature 64 is connected to a pole 74 on the same side of the switch as pole 75. Conductor 71 is also connected through a wire 78 and the main power switch 48 to the neutral or middle contact 79 on the receptacle 58. Pole 75, pole 76, and conductor 70 from the armature 64 are connected through a wire 80 to one of the other contacts 81 on receptacle 58. The remaining pole 77 of switch 60, on the same side of the switch as pole 76 and diagonally opposite pole 74, is connected through a wire 82 and the current-limiting adjustable resistor 56 to the third contact 83 on the receptacle 58. The buzzer 34 and its control switch 32 are connected to wires 70 and 78, thus putting it directly across the armature 64. A condenser 84 is connected across the buzzer contacts.

If the machine is to be operated on some usually available high voltage source, such as 110 volts A. C. or D. C., a cord and plug arrangement, generally indicated at 85, is used to connect the machine to the power supply. This cord and plug arrangement consists of a standard two-prong power supply plug 86 connected to one end of a two-wire cable 88, the other end of which is connected to two of the contacts of a three-way plug 90 adapted to coact with the three-way receptacle 58 mounted on the back of housing 4 of the dictating machine. Thus a connection is made between the two wires of cable 88 and contacts 79 and 83 of the receptacle 58.

If the machine is to be operated on some low-voltage source of electrical power such as a 6- or 12-volt storage battery, connection is made between this source of power and the machine by means of a cord and plug arrangement, generally indicated at 95, and comprising a bayonet type connector 92, adapted to fit into a bayonet type socket of the kind usually employed in automobiles or boats, which is connected to one end of a two-wire cable 94. The two wires at the other end of this cable 94 are so connected to two of the contacts on a three-way plug 96, that when this plug is inserted in the receptacle 58 on the dictating machine, contact is made between the two wires of cable 94 and contacts 79 and 81 of this receptacle 58. If desired, a pair of battery clips may be substituted for the bayonet type lug 92 so that the cable 94 may be connected directly to the electrodes of a storage battery. These two cables 88 and 94 are preferably secured to each other by some suitable means such as clamp 98 near the three-way plugs 90 and 96 so that they will always be together and with the machine, and so available when either low voltage or high voltage operation is desired.

When it is desired to operate the dictating machine on a high voltage such as 110 volts, plug 86 is plugged into a suitable wall outlet, and plug 90 is plugged into the receptacle 58. When the double-pole double-throw switch 60 is thrown to the left or high voltage side, this connects the field 62 in series with armature 64 and resistor 56 across the power supply, and the motor 2 operates as a series motor. The resistor 56 is set at a value dependent upon the line voltage and upon whether this voltage is A. C. or D. C. A greater amount of resistance is required in the circuit if the line voltage is high. Likewise, if the motor is operating on D. C. more resistance is required because the inductive reactance of the motor is ineffective as an impedance in D. C. operation. With this arrangement, the motor will start whenever the master switch 48 is closed by removing the speaking tube 38 from hook 44.

If it is desired to operate the machine on a low-voltage source, such as a 6-volt storage battery, plug 92 is inserted into a suitable outlet to which the storage battery is connected, and plug 96 is inserted in receptacle 58 instead of plug 90. Switch 60 is thrown to the right or low voltage connection. This operation connects the armature 64 in parallel with the field 62, and the motor 2 then operates as a low-voltage shunt motor when the master switch 48 is closed.

With either the high or the low voltage connection, the buzzer 34 is always connected across the armature 64 and operates whenever switch 32 is closed, as, for example, when the instrument is not properly conditioned for recording. Inasmuch as the voltage across the armature 64 varies over a comparatively wide range, depending on whether the motor is operating as a series or shunt motor, or on A. C. or D. C., a condenser 84 is connected across the contacts of the buzzer 34 to prevent sparking between the contacts over the higher ranges of armature voltage.

This arrangement provides a simple and foolproof means for operating a dictating machine on electrical power sources of various voltages, any one of which may chance to be the only source of power available for operation. The only manipulation necessary is to use the cord and plug corresponding to the source of voltage to be used and to operate the double-pole double-throw switch 60.

It should be noted that it is not possible to injure the motor 2 by having the switch 60 in the wrong position because of the novel circuit arrangement and because of the three-way receptacle 58 which is designed to receive the plugs 90 and 96 in only one position. For example, if switch 60 is thrown to the right or low voltage position, and the high voltage cord and plug 85 are connected to receptacle 58, the motor will not operate because there is no power source connected to contact 81 of receptacle 58 and contact 83 of the receptacle 58 is merely connected to the disconnected pole 77 of switch 60. A similar situation exists if the low voltage cord and plug arrangement 95 is used and the switch 60 is in its left-hand or high voltage position. In that case no power source is connected to contact 83 of receptacle 58.

As many possible embodiments of the present invention may be made without departing from the scope thereof, it is to be understood that all matter herein set forth or shown in the accompanying drawing is to be interpreted as illustrative only and not in a limiting sense.

I claim:

1. In apparatus of the character described in which it is desirable to operate a driving motor at constant speed from either a high voltage or a low voltage source of electric power, in combination, a field winding, an armature winding, a wiring and switching assembly comprising, switch means, means constituting a first circuit which is completed by operating said switch means to connect said field winding and said armature winding in series, means constituting a second circuit which is completed by operating said switch means to connect said field winding and said armature winding in parallel, means to connect said first circuit to a high voltage source, and means to connect said second circuit to a low voltage source.

2. The combination according to claim 1 wherein said switch means is a two-position switch which assumes a first position to complete said first circuit and a second position to complete said second circuit.

3. The combination according to claim 1 wherein an electric signal device safely operable only within a limited voltage range, and a signal control switch, are connected in series across said armature winding at all times whereby said signal is always safely operable whether said motor apparatus is connected to said high voltage source or said low voltage source.

4. The combination according to claim 1 wherein said high voltage source supplies power at approximately 110 volts and said low voltage source supplies power at approximately 6 volts, and a predetermined impedance is provided in said first circuit.

5. The combination according to claim 1 wherein said first and second circuits have a first connection common to said high and low voltage sources and second and third connections individual respectively to said sources, and a motor control switch provided in said common connection.

6. The combination according to claim 1 wherein the first and second terminals of a triple terminal contact device are connected in said first circuit, the first and third terminals of said device are connected in said second circuit, said means connecting said first circuit to said high voltage source comprises a first triple terminal connector adapted to coact with said contact device in one position only and a double conductor cable connected to said high voltage source and the first and second terminals of said first connector, and said means connecting said second circuit to said low voltage source comprises a second connector similar to said first connector and a second double conductor cable connected to said low voltage source and the first and third terminals of said second connector.

LELAND D. NORTON.